(12) United States Patent
Vanamamalai et al.

(10) Patent No.: US 7,877,553 B2
(45) Date of Patent: Jan. 25, 2011

(54) SHARING VOLUME DATA VIA SHADOW COPIES USING DIFFERENTIAL AREAS

(75) Inventors: Thothathri Vanamamalai, Mill Creek, WA (US); Karan Mehra, Sammamish, WA (US); Paul Adrian Oltean, Redmond, WA (US); Rajsekhar Das, Kirkland, WA (US); Norbert Kusters, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 11/834,028

(22) Filed: Aug. 6, 2007

(65) Prior Publication Data
US 2009/0043968 A1 Feb. 12, 2009

(51) Int. Cl.
*G06F 13/00* (2006.01)
(52) U.S. Cl. ...................... 711/152; 711/161
(58) Field of Classification Search .......... 711/152, 711/161
See application file for complete search history.

(56) References Cited

U.S. PATENT DOCUMENTS

| | | | |
|---|---|---|---|
| 6,865,597 B1 | 3/2005 | Bandopadhyay et al. | |
| 6,877,107 B2 | 4/2005 | Giotta et al. | |
| 7,080,221 B1 | 7/2006 | Todd et al. | |
| 7,120,650 B2 | 10/2006 | Loy et al. | |
| 7,139,809 B2 | 11/2006 | Husain et al. | |
| 7,181,574 B1 | 2/2007 | Lele | |
| 2002/0049718 A1 | 4/2002 | Kleiman et al. | |
| 2004/0243650 A1 | 12/2004 | McCrory et al. | |
| 2004/0254936 A1 | 12/2004 | Mohamed | |
| 2006/0053259 A1 | 3/2006 | Berkowitz et al. | |
| 2006/0064444 A1* | 3/2006 | van Ingen et al. | 707/204 |
| 2006/0277383 A1 | 12/2006 | Hayden et al. | |
| 2007/0156793 A1* | 7/2007 | D'Souza et al. | 707/204 |
| 2007/0233756 A1* | 10/2007 | D'Souza et al. | 707/204 |

OTHER PUBLICATIONS

Thomas, "Oracle 10g on Linux Cluster", Jul. 7, 2005, Performance Tuning Corporation, pp. 17.
"HP Best Practices for Microsoft Exchange Server 2000 and 2003 Cluster Deployments", Hewlett-Packard Development Company, 2004, pp. 1-76.
Barclay, et al., "TerraServer SAN-Cluster Architecture and Operations Experience", Microsoft Research Technical Report, Jul. 2004, pp. 1-18.
International Search Report and Written Opinion for application No. PCT/US2008/072248, dated Feb. 27, 2009, International Searching Authority, 11 pages.
International Search Report and Written Opinion for International Application No. PCT/US2008/072248 dated Feb. 27, 2009, 11 pages.

* cited by examiner

Primary Examiner—Reba I Elmore (57) ABSTRACT

Aspects of the subject matter described herein relate to sharing volume data via shadow copies. In aspects, an active computer creates a shadow copy of a volume. The shadow copy is exposed to one or more passive computers that may read but not write to the volume. A passive computer may obtain data from the shadow copy by determining whether the data has been written to a differential area and, if so, reading it from the differential area. If the data has not been written to the differential area, the passive computer may obtain it by first reading it from the volume, then re-determining whether it has been written to the differential area, and if so, reading the data from the differential area. Otherwise, the data read from the volume corresponds to the data needed for the shadow copy.

17 Claims, 6 Drawing Sheets

SHARING VOLUME DATA VIA SHADOW COPIES USING DIFFERENTIAL AREAS

BACKGROUND

In some computer systems, a volume may be mounted by only one server at a time. Normally this is not a problem as the computer that has mounted the volume may be able to effectively utilize the full bandwidth of the storage subsystem hosting the volume. Some storage subsystems, however, have considerable bandwidth with respect to accessing data. In other environments, the server may have to do a lot of computation in conjunction with accessing data on the volume. Furthermore, even a relatively fast server may have concurrent requests from many clients that reduce the responsiveness of the server to a level that is unacceptable. In the systems and environments above, the server may become a bottleneck for accessing data on the storage subsystem.

SUMMARY

Briefly, aspects of the subject matter described herein relate to sharing volume data via shadow copies. In aspects, an active computer creates a shadow copy of a volume. The shadow copy is exposed to one or more passive computers that may read but not write to the volume. A passive computer may obtain data from the shadow copy by determining whether the data has been written to a differential area and, if so, reading it from the differential area. If the data has not been written to the differential area, the passive computer may obtain it by first reading it from the volume, then re-determining whether it has been written to the differential area, and if so, reading the data from the differential area. Otherwise, the data read from the volume corresponds to the data needed for the shadow copy.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
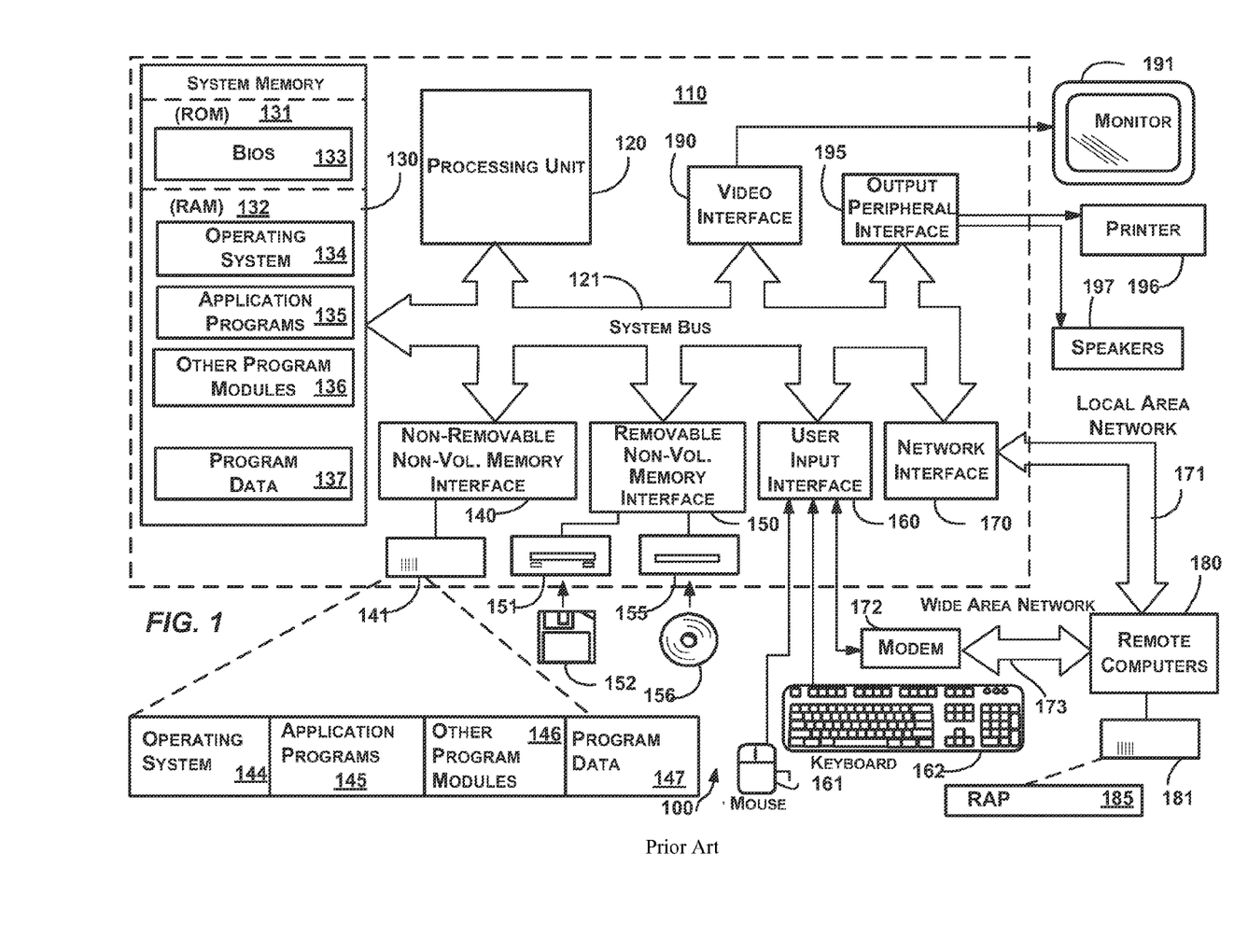
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Sharing a Volume Via a Shadow Copy

Figure 2:
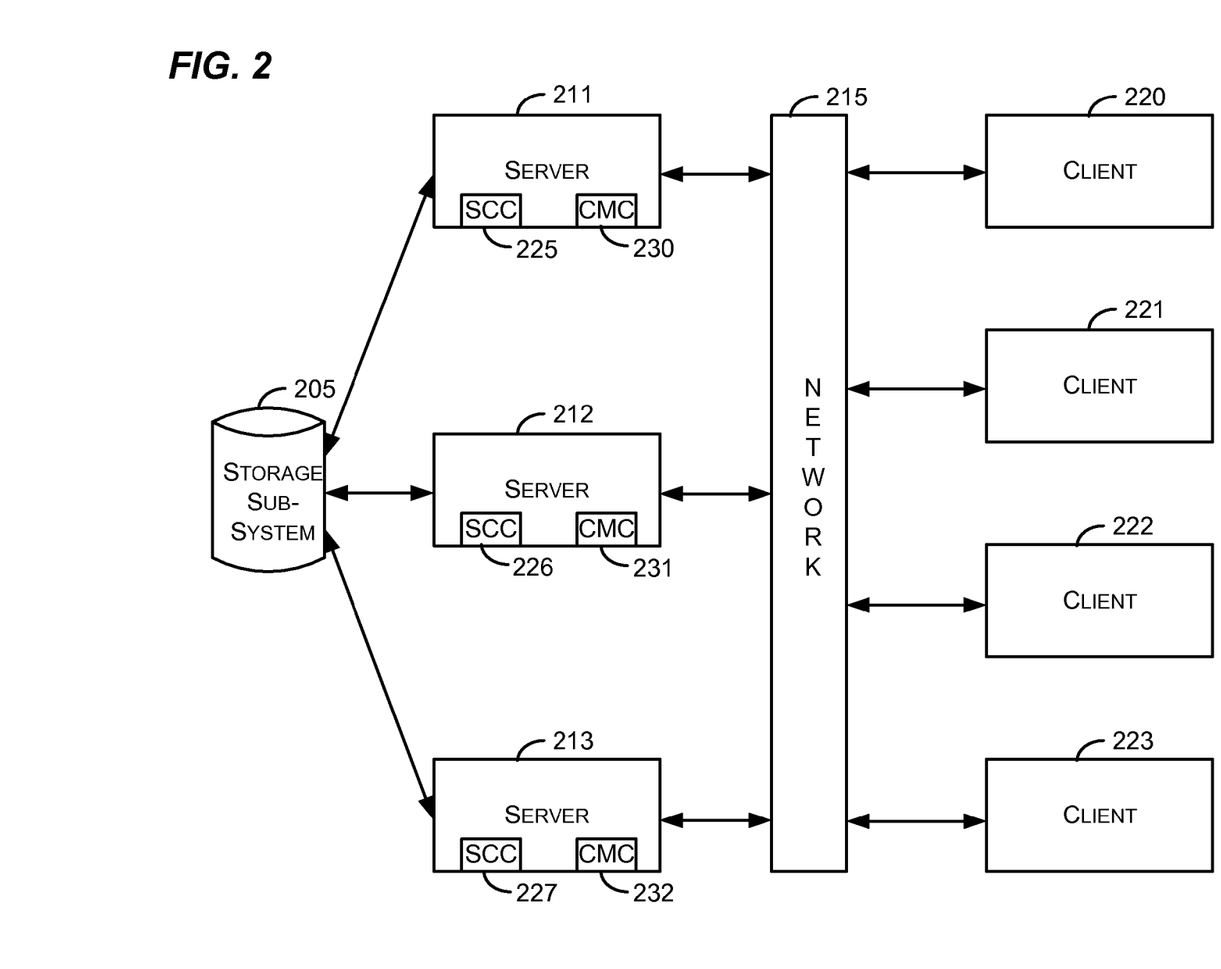
FIG. 2 is a block diagram that illustrates an exemplary environment in accordance with aspects of the subject matter described herein.

As mentioned previously, a server may become a bottleneck for accessing data in a storage subsystem. FIG. 2 is a block diagram that illustrates an exemplary environment in accordance with aspects of the subject matter described herein. The environment includes a storage subsystem 205, servers 211-213, a network 215, and clients 220-223 and may include other entities (not shown). The various entities may communicate with each other via various networks including intra- and inter-office networks and the network 215. In one embodiment, the network 215 may comprise the Internet.

Each of the servers 211-213 and the clients 220-223 may be implemented on or as one or more computers (e.g., computer 110 as described in conjunction with FIG. 1). The servers 211-213 include shadow copy components 225-227 and cluster management components 230-232, respectively. The cluster management components may communicate with a cluster manager (not shown) that manages the activities of the servers. The shadow copy components 225-227 may maintain and/or access shadow copies stored on the storage subsystem 205 as described in more detail below in conjunction with FIGS. 3-6.

The storage subsystem 205 may comprise a storage area network (SAN), one or more other storage devices, and the like. The storage subsystem 205 may be connected to the servers 205-207 via a high speed communication link such as Fibre Channel, for example.

For any particular volume in the storage subsystem 205, one of the servers may be designated as the active server while one or more of the other servers may be designated as passive servers. This designation may be performed by a cluster manager communicating this information to the various cluster management components 230-232. The active server may have read/write access to the volume while the passive servers may have read only access to a shadow copy of the volume. If the active server fails or becomes otherwise unable to provide services and/or access the volume, another of the servers may be designated as the active server.

In one embodiment, read requests may be directed to any of the servers 211-213. In another embodiment, read requests may be directed strictly to the passive servers. Write requests may be directed to an active server.

The read only access granted to the passive servers may be accomplished via the use of a shadow copy of the volume. New shadow copies may be created for the volume periodically. The new shadow copies may be exposed to the passive servers for use in subsequent read requests to the volume. Shadow copies are described in more detail in conjunction with FIG. 3 and will not be described more here.

Although the environment described above includes three servers and four clients, it will be recognized that more, fewer, or a different combination of these and other entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
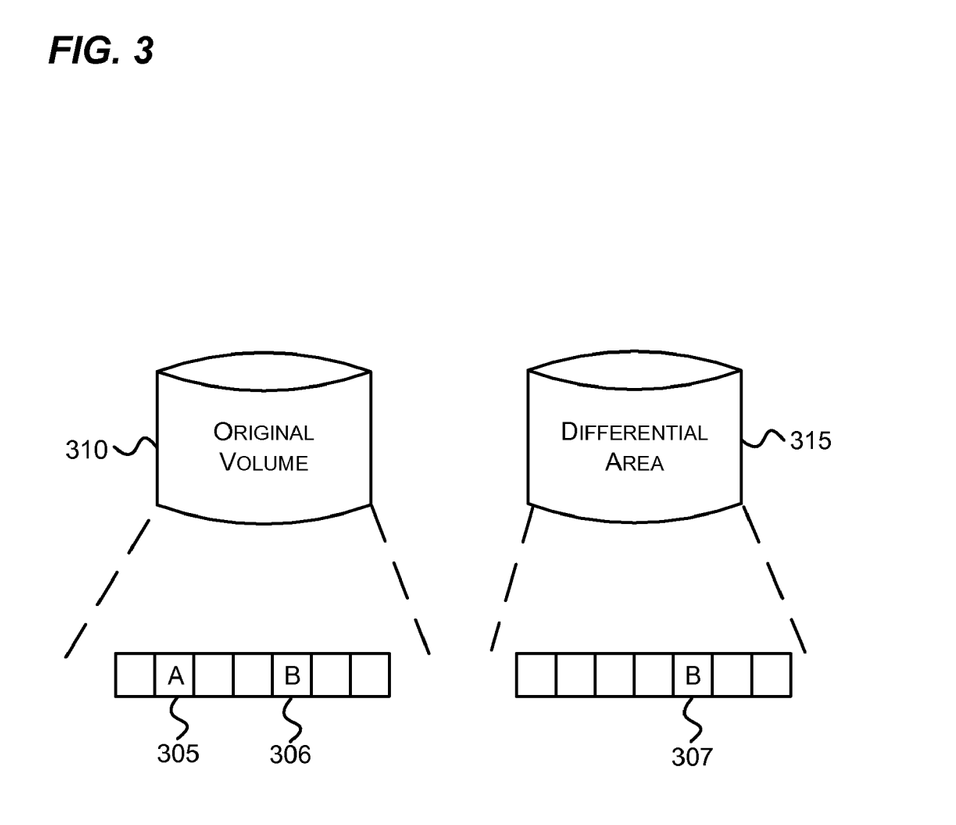
FIG. 3 is a block diagram that generally represents a shadow copy mechanism in accordance with aspects of the subject matter described herein.

FIG. 3 is a block diagram that generally represents a shadow copy mechanism in accordance with aspects of the subject matter described herein. A shadow copy may be thought of as a "snapshot" of a volume. Logically, a shadow copy is an exact duplicate of a volume at a given point in time, even though the volume may not be entirely copied (e.g., via copy-on-write) in creating the shadow copy. Logically, a shadow copy may be viewed as a separate volume by the operating system and any executing applications. For example, a shadow copy may have a volume device, a volume name, a drive letter, a mount point, and any other attribute of an actual volume. In addition, a shadow copy may be exposed through a network remote path such as a network share (sometimes referred to simply as a "share") associated with it that allows access to a portion or all of the data contained within the shadow copy from a network.

A shadow copy may be created by various well-known techniques, including copy-on-write, split mirror, specialized hardware that creates a copy of the disk itself, and other methods and systems known to those skilled in the art.

Shadow copy technology may use a differential area to implement copy-on-write shadow copies. The differential area maps blocks on the volume to the contents of those blocks at the point in time that the shadow copy was created. In one embodiment, the differential mechanism of the shadow copy technology may operate on the physical block level instead of at the object (file or directory) level. The differential area 315 may be included on the same storage media upon which the original volume is stored or it may be included on a different storage media.

In a copy-on-write shadow copy system, a driver may divide a disk into extents. An extent refers to a number of contiguous blocks on a storage media and may differ depending on application. For example one application may divide a disk into extents having one size, while another application may divide the disk into extents having a different size. In some embodiments, the term "extent" is synonymous with a single block. In other embodiments, the term "extent" may mean more than one block.

If a block on the disk changes after creation of the shadow copy, before the block is changed, the extent containing the block (e.g., extent 306) is copied to a storage location (e.g., extent 307) in a differential area 315. For a particular shadow copy, an extent is only copied the first time any block within the extent changes. When a request for information in the shadow copy is received, first, a check is performed to determine if the block has changed in the original volume (e.g., by checking whether an extent containing that block exists in the differential area 315). If the block has not changed, data from the original volume is retrieved and returned. If the block has changed, data from the differential area 315 is retrieved and returned. Note that if a block is overwritten with the same data, that an extent containing the block may not be written to the differential area 315.

A bitmap may be used to indicate which extents have been written to the differential area 315. For example, the bitmap may include a one if a corresponding extent has been written to the differential area 315 and may include a zero if a corresponding extent has not been written to the differential area 315. The bitmap may be persisted in a shared storage accessible from all servers. In some embodiments, other data structures such as a list, array, table, object, or some other data structure may be used to track which extents have been written to the differential area 315.

In one embodiment, the bitmap may be cached on a server to speed access to the bitmap. In this embodiment, if the cached bitmap indicates that an extent has been copied to the differential area, this is sufficient to indicate to the server that the server needs to obtain the original data in the extent from the differential area. If the cached bitmap does not indicate that the extent has been copied to the differential area, the server may obtain a list of changes to the bitmap that have occurred since the server last read the bitmap. The server may use this list of changes to update its cached bitmap and to determine whether the extent has been copied to the differential area.

Figure 4:
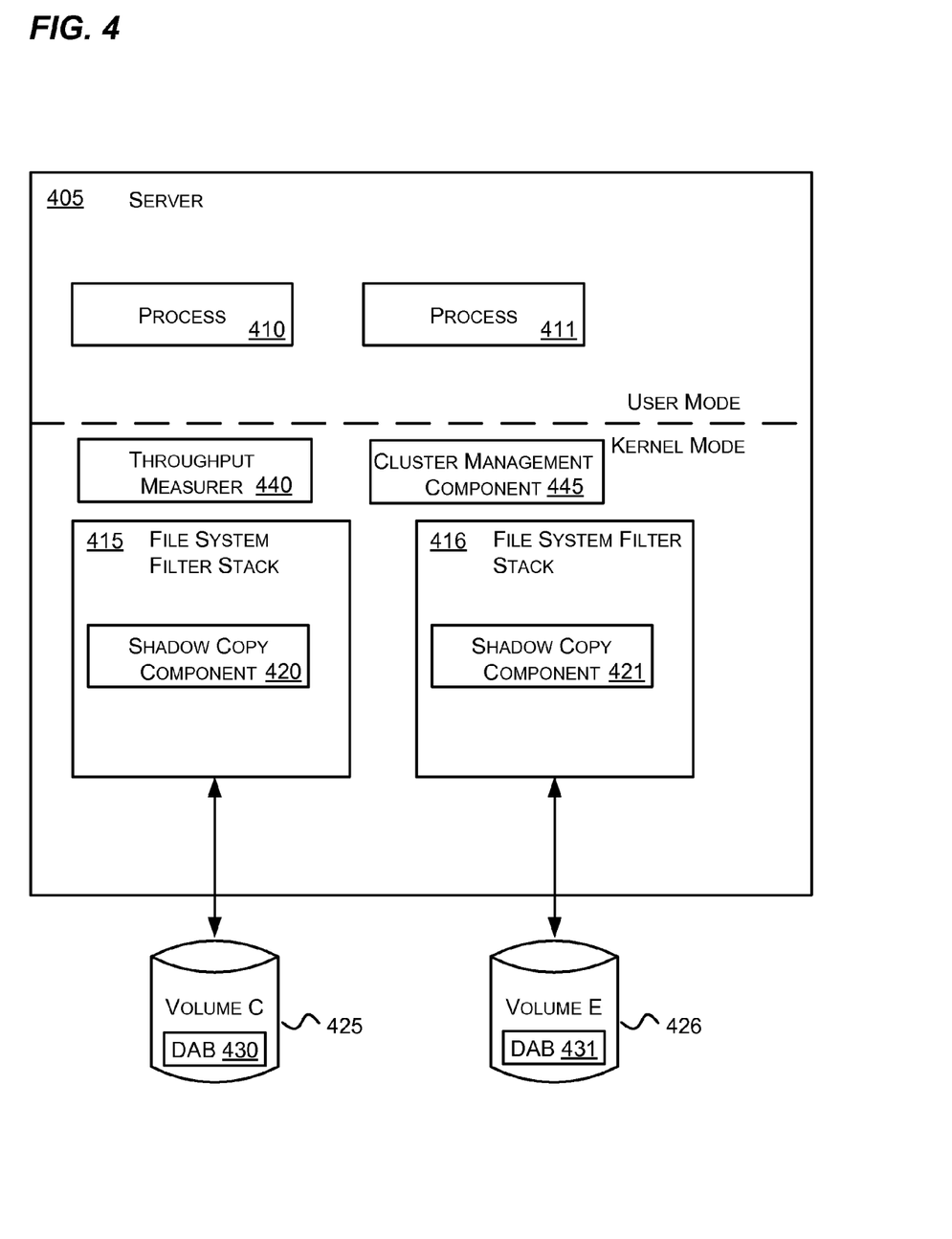
FIG. 4 is a block diagram of a computer configured to access storage in accordance with aspects of the subject matter described herein.

FIG. 4 is a block diagram of a computer configured to access storage in accordance with aspects of the subject matter described herein. The server 405 may include one or more processes 410-411 that request access to data on one or more volumes 425-426.

The server 405 may also include a throughput measurer 440 and a cluster management component 445. The throughput measurer 440 may measure throughput to a volume to determine if the throughput is decreasing or increasing. This may be done via monitoring queue depth or through other mechanisms known to those skilled in the art. Throughput for a volume may decrease if other servers increase their usage of the volume.

The throughput measurer 440 may have a certain quality of service that it is configured to have for an active server. This quality of service value may be configurable via a persistent management setting like a registry key or otherwise. If the throughput decreases below the quality of service value, the throughput measurer 440 may instruct other servers to decrease (e.g., throttle) their requests, cache more of the shadow copy, or disconnect.

In one embodiment, to notify other servers, the throughput measurer 440 may write to a data structure on the disk hosting the volume. Once the other servers read the data structure after it has been changed, they may modify their behavior accordingly. In another embodiment, the throughput measurer 440 may utilize the cluster management component 445 to notify other cluster management components on other servers to modify their behavior accordingly.

In one embodiment, the throughput measurer 440 may be part of the shadow copy component 420 or may be in the file system filter stack 415. In another embodiment, the throughput measurer 440 may be an operating system component that executes outside of the file system filter stack 415. In yet another embodiment, the throughput measurer 440 may be an application or service that executes completely or partially in user mode. Furthermore, although the cluster management component 445 is shown as executing in kernel mode, in other embodiments, it may execute partially or completely in user mode.

In one embodiment, the throughput measurer 440 may reside strictly on an active server. In other embodiments, the throughput measurer 440 may reside on active and/or passive servers. Throughput measurers on different servers may communicate with a cluster manager and/or with the throughput measurer on the active server.

In some embodiments, one or more of the processes 410-411 may execute in user mode. Such processes, for example, may be part of an application, service, or the like. In other embodiments, one or more of the processes 410-411 may execute in kernel mode. For example, an operating system process may request access to a file.

The file system filter stacks 415-416 may include shadow copy components 420-421, respectively, and may also include one or more other filters that are in the I/O path to the file system. Being in the I/O path means that any I/O request or response that proceeds to or from a storage device may be operated on by filters in a filter stack before reaching or returning from the storage device.

In some embodiments, a filter comprises any object that is capable of examining I/O between an application and a storage device and that is capable of changing, completing, or aborting the I/O or performing other actions based thereon. Such filters may execute in user mode or in kernel mode and may be part of other components.

In one embodiment, each volume may be associated with a different file system filter stack. For example, the file system filter stack 415 may be associated with volume 425 while the file system filter stack 416 may be associated with the volume 426. When a file system filter stack is associated with a volume, the filters in the file system filter stack are capable of examining and taking action based on I/O to and from the volume.

A shadow copy component (e.g., each of shadow copy components 420-421) may comprise or be part of a filter. As such, a shadow copy component may have an opportunity of examining each I/O request to and response from the volume to which the shadow copy component is associated. On an active server, a shadow copy component may perform, if needed, a copy-on-write of an extent of an original volume to the differential area as described previously. On a passive server, the shadow copy components may return an error for an attempt to read or write to an original volume.

Furthermore, on a passive server, the shadow copy components may not allow higher level filters and/or processes on a passive server to even see the original volume. For example, a process of the passive server may attempt to discover volumes on a storage device. The shadow copy component may allow the process to see shadow copy volumes but may not allow the process to see original volumes mounted by an active server.

In a read request to a shadow copy, the shadow copy components of both the active and passive servers may, in some respects, act similarly by determining whether the extent including the block requested has been copied to a differential area. If the extent has been copied to a differential area, a shadow copy component may obtain the block from the differential area. Otherwise, the shadow copy component may obtain the block from the original volume as described below in conjunction with FIG. 6.

To determine whether an extent has been copied to the differential area, the differential area bitmap 430 may be used for the volume 425 while the differential area bitmap 431 may be used for the volume 426. Note that although the bitmaps 430 and 431 are shown as residing within their respective volumes, in other embodiments, they may reside on other storage media.

As mentioned previously, new shadow copies of an active volume may be created periodically. These may be created, for example, by the shadow copy components of an active server. After a new shadow copy is available, a cluster manager may inform a cluster manager component on each affected server that a new shadow copy is available. In response, each cluster manager component may work with its corresponding shadow copy component to cause any new file access requests to be directed to the new shadow copy while allowing already open file requests to be directed to the old shadow copy. After the last file request completes for an old shadow copy, the old shadow copy may then be removed.

The frequency with which new shadow copies are created may depend on the number of writes. When writes are very frequent, it may be more expensive for servers to recreate caches for the new shadow copy. Hence, the frequency of creating new shadow copies in this case may be less. When writes are relatively infrequent, it may not be very expensive for servers to recreate caches for the new shadow copy. In this case, the frequency of creating new shadow copies may be increased.

Figure 5:
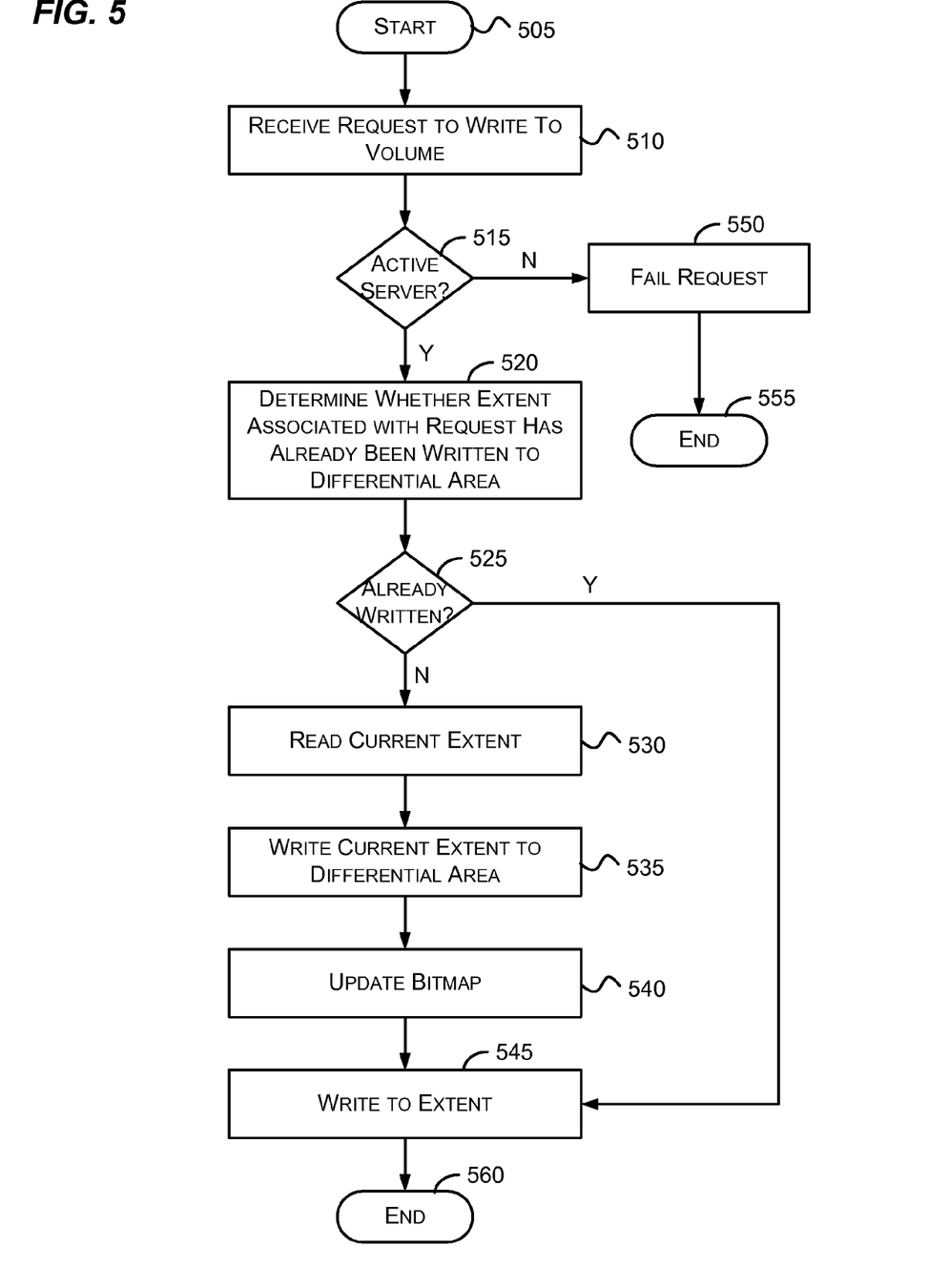
FIG. 5 is a flow diagram that generally represents actions that may occur in updating a volume in accordance with aspects of the subject matter described herein.
Figure 6:
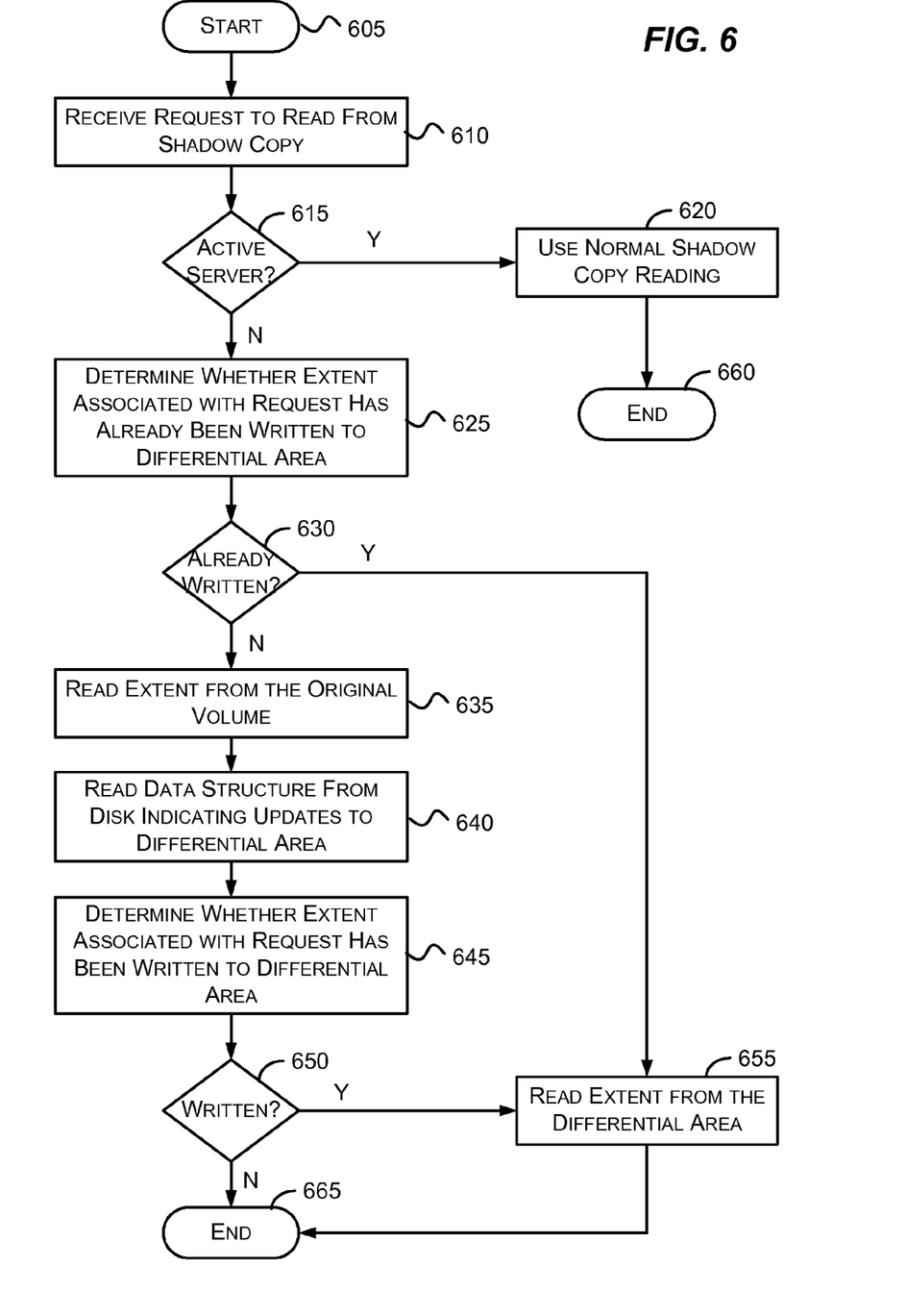
FIG. 6 is a flow diagram that generally represents actions that may occur in reading from a shadow copy in accordance with aspects of the subject matter described herein.

FIGS. 5-6 are flow diagrams that generally represent exemplary actions that may occur in reading and writing to a volume in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents actions that may occur in updating a volume in accordance with aspects of the subject matter described herein. At block 505, the actions begin.

At block 510, a request to write to a volume is received at a shadow copy component. For example, referring to FIG. 4, the process 410 may send a request to update data in one or more blocks of volume 425. This request (or a request derived therefrom) may be received by the shadow copy component 420.

For simplicity in description, in one embodiment, a request for more than one block may be broken into multiple requests for one block. Thus, one filter in the filter stack may receive a request to write data to multiple blocks and may in turn send multiple requests down the filter stack to write data to single blocks.

In other embodiments, the actions described herein may be modified to work with requests for more than one block that may span one or more extents. In particular, the actions associated with blocks 520-545 may be repeated (and/or performed in parallel) for each extent associated with the requested blocks.

At block 515 a determination is made as to whether the server is the active server. If so, the actions continue at block 520; otherwise, the actions continue at block 550. As mentioned above, if a server is an active server, the server may read and/or write to an original volume. If a server is not an active server, the server may read from a shadow copy of the volume.

At block 520, a determination is made as to whether the extent associated with the request has already been written to the differential area. For example, referring to FIG. 4, if the request is for a block on the volume 425, the differential area bitmap 430 may be consulted to determine whether the extent associated with the block has been written to a differential area.

At block 525, if the extent associated with the requested block has already been written to the differential area, the actions continue at block 545; otherwise, the actions continue at block 530.

At block 530, an extent associated with the requested block is read from the original volume. For example, referring to FIG. 3, the extent 306 may be read.

At block 535, the extent is written to the differential area. For example, referring to FIG. 3, the extent 306 is written to the extent 307 on the differential area 315.

At block 540, a data structure that tracks extents copied to the differential area is updated. For example, referring to FIGS. 3 and 4, the difference area bitmap 430 is updated to indicate that the extent 306 has been updated.

At block 545, the data is written to the extent. For example, referring to FIG. 3, new data may be written in the extent 306.

At block 550, if a passive server attempts to write to a volume, the request is failed and an error code may be sent to the requesting process.

At blocks 555 and 560, the actions end.

FIG. 6 is a flow diagram that generally represents actions that may occur in reading from a shadow copy in accordance with aspects of the subject matter described herein. At block 605, the actions begin.

At block 610, a request to read from a shadow copy is received. For example, referring to FIG. 4, the process 411 may send a read request to obtain data in one or more blocks of a shadow copy of volume 426. This request (or a request derived therefrom) may be received by the shadow copy component 421.

Similarly to that described in conjunction with FIG. 5, in one embodiment, a request for more than one block may be broken into multiple requests, each for one block. In other embodiments, the actions described below may be modified to work with requests for more than one block that may span one or more extents. In particular, the actions associated with blocks 625-6555 may be repeated (and/or performed in parallel) for each extent associated with the requested blocks.

At block 615, a determination is made as to whether the server is the active server. If so, the actions continue at block 620; otherwise, the actions continue at block 625. Because the active server knows whether it is in the process of modifying a block, the actions that need to be taken to read from the shadow copy are simplified as compared to a passive server that does not know whether the active server is in the process of modifying the requested block.

At block 620, the active server uses normal shadow copy reading to obtain the requested block. In particular, the active server may determine whether the extent associated with the block has been written to the differential area. If so, the active server may read it from the differential area. Otherwise, the active server may read the block from original volume. Because the active server is the only server authorized to change the block, the active server can be sure that when it reads the block from the original volume that the block has not been changed by another server.

At block 625, a determination is made as to whether the extent associated with the request has already been written to a differential area. For example, referring to FIG. 4, if the request is for a block on the volume 425, the differential area bitmap 430 (or a cached copy) may be consulted to determine whether the extent associated with the block has been written to a differential area.

At block 630, if the extent associated with the requested block has already been written to the differential area, the actions continue at block 655; otherwise, the actions continue at block 635.

At block 635, the extent associated with the requested block is read from the original volume. For example, referring to FIG. 3, the extent 306 may be read.

At block 645, a data structure (e.g., a bitmap) that tracks extents copied to the differential area is read from the disk. It is possible that the active server was updating the requested block while the passive server was reading it. As a result, the passive server may get inconsistent data from the block. However, because of the sequence of steps that an active server takes, if the bitmap on disk indicates that the extent has not been copied to the differential area, then the passive server is assured that the extent it just read from the original volume is consistent. On the other hand, if the bitmap indicates that the extent was copied to the differential area, the passive server may then obtain the block from the differential area and know that this block will not be overwritten during this action since once a block is copied to the differential area, it does not need to be recopied to the differential area for future updates on the original volume.

In one embodiment, as an optimization, changes to the data structure that have occurred since the passive server last read the data structure are read at block 640. These changes are used to update the cached copy of the data structure that is included on the passive server. The cached copy may then be used to determine whether an extent associated with a block has been written to the differential area.

At block 645, a determination is made as to whether the extent associated with the request has been written to the differential area. Even though this check was performed above in conjunction with block 625, it is performed again at block 645 because the extent could have been written to the disk at the same time or in between actions associated with blocks 625-635.

At block 650, if the extent has been written to the differential area, the actions continue at block 655. Otherwise, the actions continue at block 665.

At block 655, the block is read from the differential area. For example, referring to FIG. 3, the block is read from the extent 307 of the differential area 315.

At blocks 660 and 665, the actions end.

Note that it is possible to have a shadow copy deleted. Before a server reads the shadow copy it may read control data associated with the shadow copy to determine if the shadow copy still exists. If the shadow copy has been deleted, the shadow copy component of the server may return an error to the calling process.

In some embodiment, deleting an old shadow copy while any server still has an open handle to the shadow copy is disallowed. In other embodiments, deleting an old shadow copy may be allowed. In these other embodiments, an interface on each of the servers involved with a shadow copy may be called to synchronize a delete of the shadow copy. In response to receiving notification via the interface, a shadow copy component may temporarily deny access to the shadow copy until the shadow copy is deleted. After the shadow copy is deleted, the shadow copy component may fail subsequent requests to the delete shadow copy and/or prepare to read from another shadow copy if desired.

As can be seen from the foregoing detailed description, aspects have been described related to accessing content. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having computer-executable instructions, which when executed perform actions, comprising:
    exposing a shadow copy of a volume to one or more passive computers that have read access to the volume and do not have write access to the volume;
    receiving a request from a passive computer to read data from the shadow copy;
    determining whether an extent associated with the data has been written to a differential area associated with the shadow copy;
    if the extent associated with the data has been written to the differential area, reading the data from the differential area; and
    if the extent associated with the data has not been written to the differential area, performing actions, comprising reading the extent from the volume and afterwards re-determining whether the extent associated with the data has been written to the differential area.

2. The computer-readable storage medium of claim 1, wherein a second computer has read/write access to the volume and wherein the second computer is allowed to change the volume and corresponding shadow copy at any time without notifying the first computer.

3. The computer-readable storage medium of claim 1, wherein determining whether an extent associated with the data has been written to a differential area comprises reading a data structure that indicates which extents have been written to the differential area.

4. The computer-readable storage medium of claim 3, wherein the data structure is cached on a device requesting the data.

5. The computer-readable storage medium of claim 4, wherein re-determining whether the extent associated with the data has been written to the differential area comprises:
    obtaining changes that have occurred related to extents written to the differential area from a disk written to by a computer having read/write access to the volume; and
    updating the data structure to account for the changes.

6. The computer-readable storage medium of claim 1, wherein receiving a request to read data from a shadow copy of a volume comprises receiving the request or data derived therefrom at a filter that has an opportunity to examine each request for data from storage.

7. The computer-readable storage medium of claim 1, wherein the extent corresponds to a disk block of the shadow copy.

8. The computer-readable storage medium of claim 1, wherein the extent corresponds to more than one disk block of the shadow copy.

9. The computer-readable storage medium of claim 1, wherein if in re-determining whether the extent associated with the data has been written to the differential area it is determined that the extent has been written to the different area, reading the data from the differential area.

10. The computer-readable storage medium of claim 1, further comprising receiving an instruction to decrease read accesses from passive requestors and delaying reading from the volume and the differential area in response thereto.

11. The computer-readable storage medium of claim 1, further comprising receiving an instruction to disconnect from the volume and subsequently disallowing any future reads of the volume until instructed otherwise.

12. A method implemented at least in part by a computer, the method comprising:
    exposing a shadow copy of a volume to one or more passive computers that have read access to the volume and do not have write access to the volume;
    receiving a request from a requester to write to the volume;
    determining whether write access is granted to the volume for the requester by determining whether the requester is one of the one or more passive computers;
    if write access is granted, determining whether an extent associated with the request has already been written to a differential area associated with the shadow copy; and
    if write access is not granted, failing the request.

13. The method of claim 12, wherein if the extent associated with the request has not been written to a differential area associated with the shadow copy, then performing actions comprising:
    reading an extent associated with the request from the volume;
    writing the extent to a differential area;
    updating a data structure to indicate that the extent has been written to the differential area; and
    writing to the extent in accordance with the request.

14. The method of claim 12, wherein if the extent associated with the request has been written to a differential area associated with the shadow copy, then refraining from copying the extent to the differential area again and then writing to the extent in accordance with the request.

15. In a computing environment, an apparatus, comprising:
    a shadow copy component operable to provide access to a shadow copy of a volume, the shadow copy component allowing read-only access to the volume if the apparatus is designated as passive and allowing read/write access to the volume if the apparatus is designated as active, the apparatus being part of a group of apparatuses having access to the volume; and a cluster management component operable to receive an indication as to whether the apparatus is designated as active or passive;

the shadow copy component being further configured to receive a request to read from the shadow copy, and if the indication indicates the apparatus to be designated as passive, to determine whether an extent associated with the read has already been written to a differential area associated with the shadow copy, if the extent has not already been written to a differential area, the shadow copy component being configured to read the extent from the volume, and if the extent has been written to the differential area, the shadow copy component being configured to read the extent from the differential area to respond to the request.

16. The apparatus of claim 15, further comprising, a third component operable to change an allowed rate of accesses to the volume via the shadow copy component depending on an instruction received from another apparatus.

17. The apparatus of claim 15, further comprising a throughput measuring component operable to measure throughput to the volume and to notify cluster management components on other apparatuses to change their allowed rates of accesses to the volume or to disconnect or reconnect to the volume.

* * * * *